United States Patent
Inai et al.

(10) Patent No.: US 9,180,815 B2
(45) Date of Patent: Nov. 10, 2015

(54) VEHICLE DOOR

(71) Applicant: HONDA MOTOR CO., LTD., Tokyo (JP)

(72) Inventors: Yohei Inai, Wako (JP); Osamu Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/323,290

(22) Filed: Jul. 3, 2014

(65) Prior Publication Data

US 2015/0008697 A1    Jan. 8, 2015

(30) Foreign Application Priority Data

Jul. 3, 2013    (JP) ................. 2013-139815

(51) Int. Cl.
*B60J 5/04*    (2006.01)
*B60R 1/00*    (2006.01)

(52) U.S. Cl.
CPC ............... *B60R 1/006* (2013.01); *B60J 5/0451* (2013.01); *B60J 5/0469* (2013.01)

(58) Field of Classification Search
CPC ........ B60J 5/042; B60J 5/0469; B60J 5/0451; B60R 1/06

USPC ................. 296/146.5, 146.6, 96.12
See application file for complete search history.

(56) References Cited

U.S. PATENT DOCUMENTS

| | | | | |
|---|---|---|---|---|
| 6,164,716 | A  * | 12/2000 | Palazzolo et al. | 296/187.12 |
| 6,332,641 | B1 * | 12/2001 | Okana | 296/146.6 |
| 7,380,866 | B2 * | 6/2008 | Saitoh et al. | 296/146.5 |
| 2014/0298727 | A1 * | 10/2014 | Fukui et al. | 49/506 |

FOREIGN PATENT DOCUMENTS

| | | | | |
|---|---|---|---|---|
| JP | 6-11879 | Y2 | 3/1994 | |
| JP | 6-171369 | * | 6/1994 | ............... B60J 5/10 |
| JP | 4196688 | B2 | 12/2008 | |
| WO | WO 2009/051174 | * | 10/2008 | ............... B60J 5/04 |

* cited by examiner

*Primary Examiner* — Dennis H Pedder
(74) *Attorney, Agent, or Firm* — Westerman, Hattori, Daniels & Adrian, LLP

(57) ABSTRACT

In a vehicle door, a door panel is formed by joining an inner panel and an outer panel together, and the door panel is provided with a front door sash. The vehicle door includes a door front edge of the door panel, a sash front edge at a front end of the front door sash, and a step extending from the sash front edge to an upper end of the door front edge. In the step, an inner step portion of the inner panel and an outer step portion of the outer panel are joined together by hemming.

5 Claims, 12 Drawing Sheets

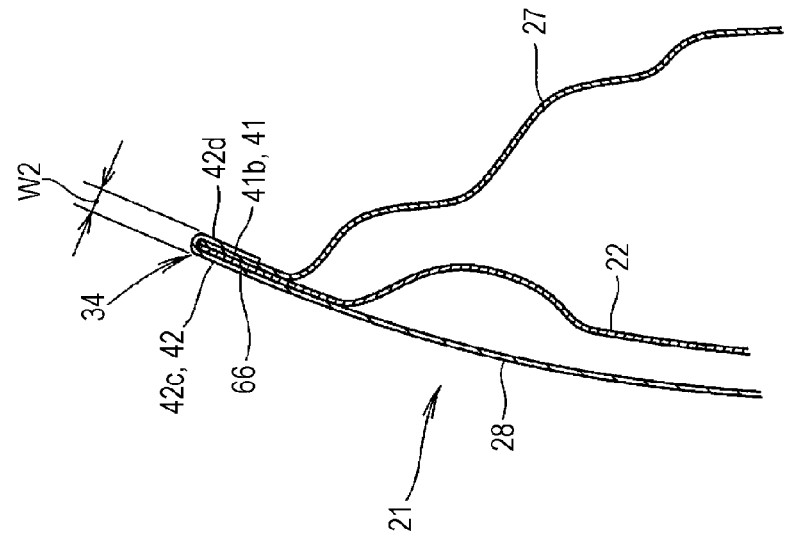
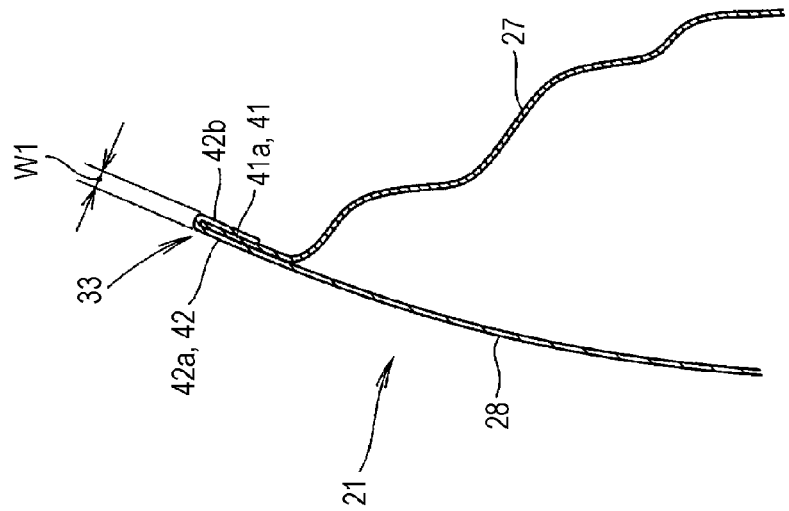

VEHICLE DOOR

CROSS REFERENCES TO RELATED APPLICATIONS

The present application claims priority under 35 U.S.C. §119 to Japanese Patent Application No. 2013-139815, filed Jul. 3, 2013, entitled "Vehicle Door." The contents of this application are incorporated herein by reference in their entirety.

TECHNICAL FIELD

The present application relates to a vehicle door including a door panel that is formed by joining an inner panel and an outer panel together and is provided with a door sash.

BACKGROUND

A known type of vehicle door includes a door panel composed of an inner panel and an outer panel. In such a vehicle door, a door sash extends upward from a midpoint of the upper edge of the door panel, and part (hereinafter referred to as a step) of the upper edge extends from the door sash to the front edge. The step is formed by joining an inner portion of the inner panel corresponding to the step and an outer portion of the outer panel corresponding to the step together.

Specifically, the outer portion is bent inward in the vehicle width direction, and the upper edge of the inner portion is aligned with the bent outer portion, and thereby joint margins are obtained. The step is formed by joining the joint margins together with an adhesive or by welding (e.g., MIG welding), with the upper edge of the inner portion being aligned with the outer portion (see, for example, Japanese Patent No. 4196688).

The step, which is part of the upper edge, extends from the door sash to the front edge so that the door sash is located rearward of the front edge of the door panel in the vehicle body. In this manner, a wide space for a quarter window is obtained in front of the door sash in the vehicle body.

SUMMARY

However, to obtain the joint margins for an adhesive or MIG welding, the outer portion of the step in Japanese Patent No. 4196688 needs to be bent inward in the vehicle width direction. Thus, there is room for improvement in that the upper edge of the step projects in the vehicle width direction. In addition, the joint between the inner portion and the outer portion formed by means of an adhesive or MIG welding requires redundant members (components) such as an adhesive or a welding rod, resulting in difficulty in reduction of cost and weight.

The present application describes a vehicle door having a door panel (a step) that is narrow in the vehicle width direction. This vehicle door can be produced with reduced cost and weight because redundant members (components) such as an adhesive and a welding rod are not needed.

According to a first aspect of the embodiment, a vehicle door in which a door panel is formed by joining an inner panel and an outer panel together and a door sash extends vertically on the door panel, includes: a door front edge extending vertically at a front end of the door panel; a sash front edge extending vertically at a front end of the door sash, the door sash being located rearward of the door front edge in a vehicle body; and a step extending forward from the sash front edge in the vehicle body and connected to an upper end of the door front edge, and the step is formed by joining an inner portion of the inner panel corresponding to the step and an outer portion of the outer panel corresponding to the step together by hemming.

According to a second aspect of the embodiment, the door sash includes an inner sash panel constituting an inner wall of the door sash and an outer sash panel constituting an outside wall of the door sash, and an inner sash portion of the inner sash panel corresponding to the sash front edge and an outer sash portion of the outer sash panel corresponding to the sash front edge are joined together by hemming such that the sash front edge is continuous with the step.

According to a third aspect of the embodiment, the sash front edge and the step are formed to be flush with each other by hemming.

According to a fourth aspect of the embodiment, the vehicle door further includes: a first reinforcing member located between the inner panel and the outer panel, and the first reinforcing member is joined to the inner portion and the outer portion in the step by hemming.

According to a fifth aspect of the embodiment, the first reinforcing member is joined to the outer panel at a position rearward of the door sash in the vehicle body.

According to a sixth aspect of the embodiment, the first reinforcing member is joined to the door sash.

According to a seventh aspect of the embodiment, the vehicle door further includes: a second reinforcing member located between the inner sash panel and the outer sash panel, the second reinforcing member includes an inner wall joined to the inner sash panel, an outside wall joined to the outer sash panel, and a bottom wall coupling the inner wall and the outside wall together, the inner wall, the outside wall, and the bottom wall form a substantially U shape of the second reinforcing member in cross section, and the first reinforcing member is joined to the second reinforcing member such that the first reinforcing member is joined to the door sash via the second reinforcing member.

According to an eighth aspect of the embodiment, a door mirror is attached to the first reinforcing member with the door mirror being disposed on a side of the outer panel on an outer side of the vehicle body.

In the first aspect, the step is formed by joining the inner portion of the inner panel and the outer portion of the outer panel by hemming. Thus, the width of the step in the vehicle width direction can be reduced to (only) the thickness of the inner portion and the outer portion, thereby reducing the width of the step (i.e., the upper edge of the door panel) in the vehicle width direction.

In addition, formation of the step by joining the inner portion and the outer portion by hemming eliminates the necessity for using an adhesive or welding (e.g., MIG welding) in joining the inner portion and the outer portion. Thus, redundant members (components) such as an adhesive and a welding rod are not needed, thereby reducing the cost and weight of the vehicle door.

In the second aspect, the sash front edge is formed by joining the inner sash portion of the inner sash panel and the outer sash portion of the outer sash panel together by hemming. Thus, the sash front edge and the step are integrally formed to be continuous by hemming, thereby achieving high aesthetic quality of the vehicle door.

In the third aspect, the sash front edge and the step are formed to be flush with each other by hemming. Thus, the sash front edge and the step are smoothly continuous with each other, thereby achieving higher aesthetic quality of the vehicle door.

In the fourth aspect, the first reinforcing member is joined to the inner portion and the outer portion by hemming. Thus, the number of steps (processes) of forming the door panel can be reduced, as compared to the case of individually joining the first reinforcing member to the inner portion and the outer portion in different steps.

In the fifth aspect, the first reinforcing member is joined to the outer panel at a position rearward of the door sash in the vehicle body. The first reinforcing member is joined to the step forward of the sash front edge (i.e., the door sash) in the vehicle body. Thus, the first reinforcing member is joined to two portions sandwiching the door sash in the longitudinal direction, i.e., forward-to-rearward direction, of the vehicle body, thereby reinforcing the first reinforcing member and the outer panel by means of the door sash.

The reinforcement of the first reinforcing member and the outer panel can prevent deformation of the first reinforcing member and the outer panel in the vehicle width direction by means of the door sash. In this manner, the first reinforcing member can be stably attached, thereby stabilizing the joining of the step by hemming.

In the sixth aspect, the first reinforcing member is joined to the door sash. This allows the door sash to reinforce the first reinforcing member more strongly. In this manner, the rigidity of the first reinforcing member can be further enhanced with the door sash, thereby further stabilizing the joining of the step by hemming.

In the seventh aspect, the vehicle door includes the second reinforcing member located between the inner sash panel and the outer sash panel, and the second reinforcing member has a substantially U shaped cross section. Formation of the substantially U-shape of the second reinforcing member in cross section can achieve the rigidity of the second reinforcing member. The first reinforcing member is joined to the second reinforcing member such that the first reinforcing member is joined to the door sash via the second reinforcing member. In this manner, the rigidity of the first reinforcing member can be enhanced by means of the second reinforcing member and the door sash, thereby enabling the door sash to prevent deformation of the first reinforcing member in the vehicle width direction more suitably. As a result, the joining of the step by hemming can be further stabilized.

In the eighth aspect, the door mirror is attached to the first reinforcing member. The first reinforcing member has a high rigidity. Attaching the door mirror to the rigid first reinforcing member enables the door mirror to be firmly attached to the vehicle door.

BRIEF DESCRIPTION OF THE DRAWINGS

The advantages of the disclosure will become apparent in the following description taken in conjunction with the following drawings.

FIG. 6A is a cross-sectional view taken along line VIA-VIA in FIG. 4, and FIG. 6B is a cross-sectional view taken along line VIB-VIB in FIG. 4.

DETAILED DESCRIPTION

A preferred embodiment of the present application will be described with reference to the drawings. The "front (Fr)," "rear (Rr)," "left (L)," and "right (R)" are based on directions seen from a driver's point of view.

[Embodiment]

Figure 1:
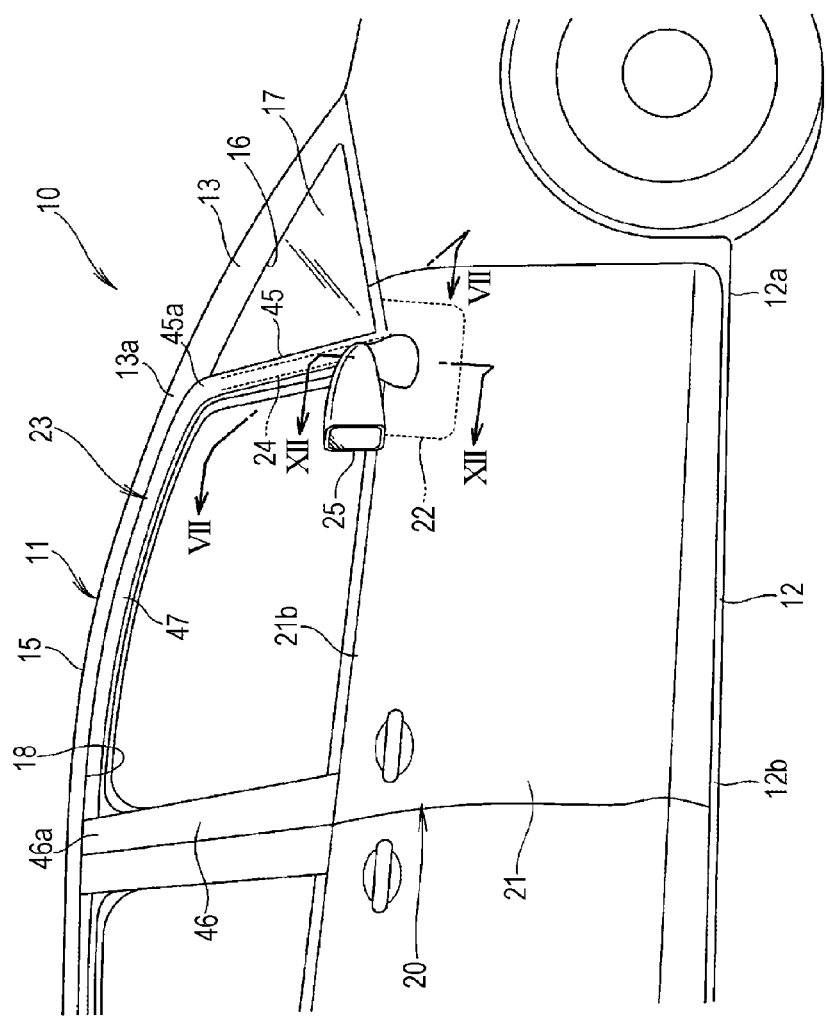
FIG. 1 is a side view of a vehicle including a vehicle door according to one embodiment of the present application.

A vehicle door 20 according to an embodiment will be described. As illustrated in FIG. 1, a vehicle 10 includes: a side sill 12 located at a lower end of a vehicle body 11; a front pillar 13 rising upward from a front end 12a of the side sill 12; a center pillar (not shown) rising upward from a middle portion 12b of the side sill 12; and a roof rail 15 spanning between an upper end 13a of the front pillar 13 and the center pillar.

The vehicle 10 further includes: a front corner pane (a quarter window pane) 17 in an opening 16 of the front pillar 13; a door opening 18 enclosed by the side sill 12, the front pillar 13, the center pillar, and the roof rail 15; and a vehicle door 20 attached to the door opening 18 such that the vehicle door 20 can be opened and closed freely.

The vehicle door 20 includes: a door panel 21 attached to the front pillar 13 with a hinge (not shown) interposed therebetween such that the door panel 21 can be opened and closed freely; a first reinforcing member 22 (see also FIG. 3) provided inside the door panel 21; a sash member 23 provided to the door panel 21; a second reinforcing member 24 (see also FIG. 3) provided inside the sash member 23; and a door mirror 25 attached to the door panel 21 (specifically the first reinforcing member 22).

Figure 2:
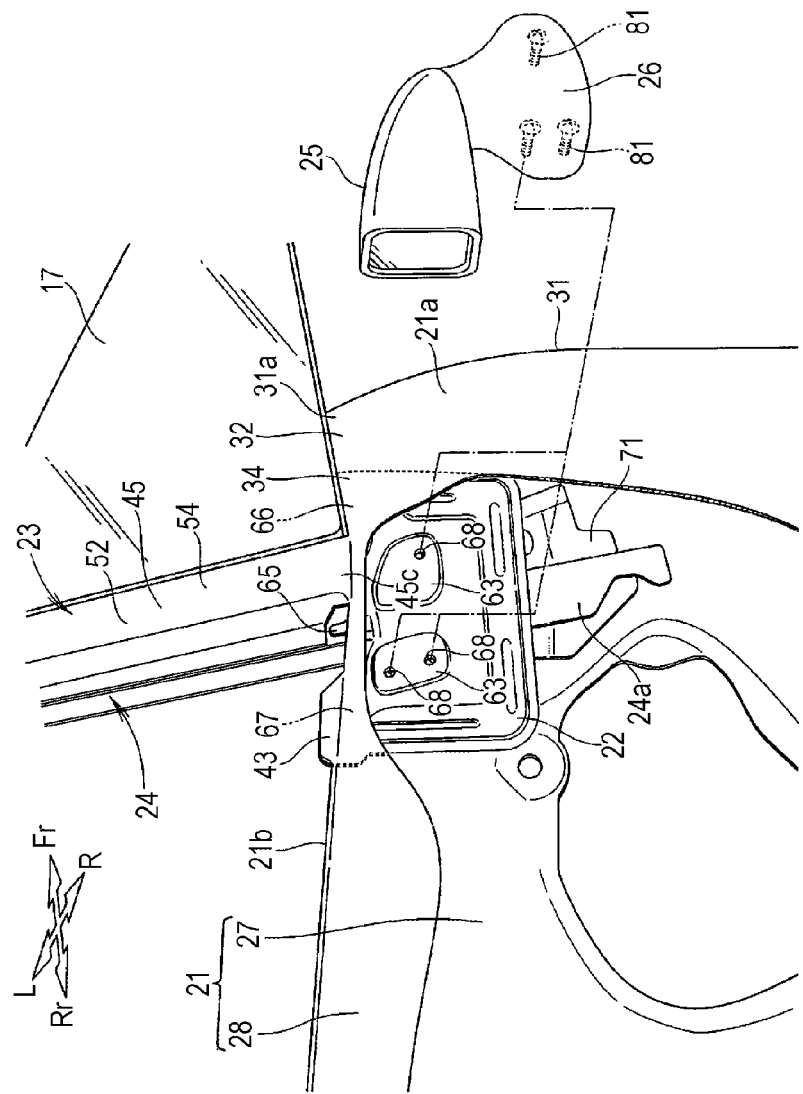
FIG. 2 is a disassembled perspective view illustrating a state in which a door mirror is detached from the vehicle door of FIG. 1.
Figure 3:
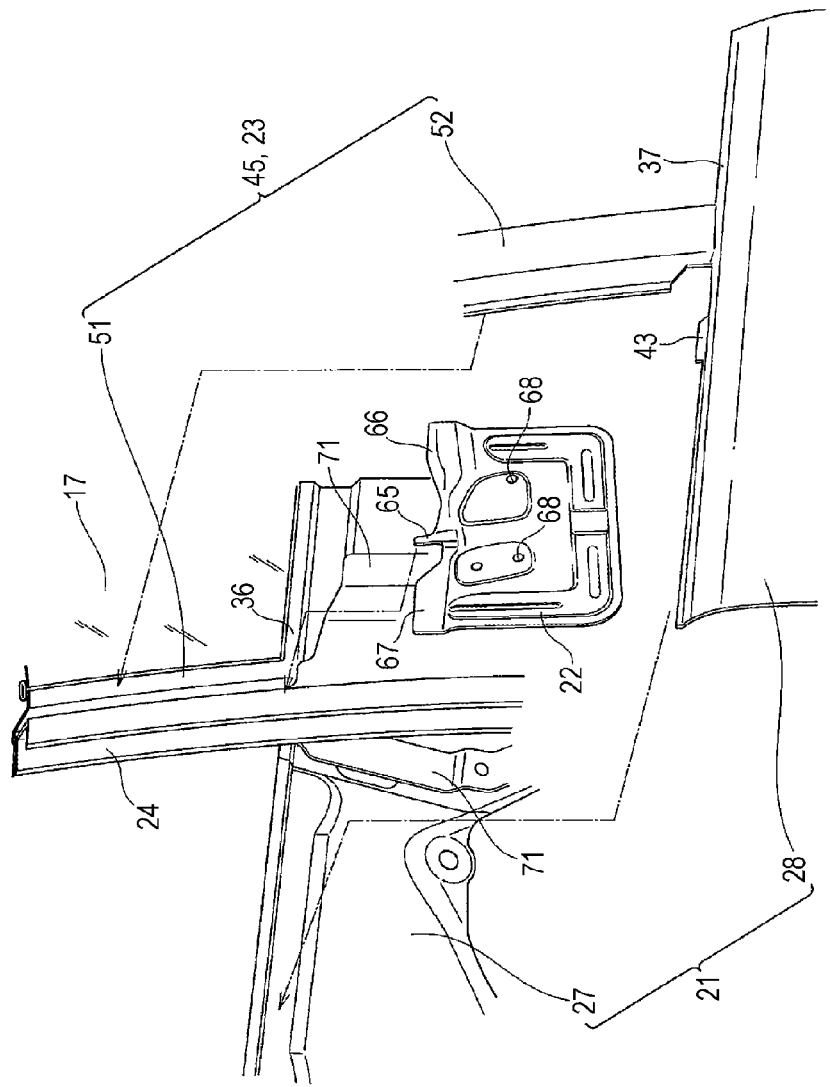
FIG. 3 is a disassembled perspective view illustrating the vehicle door of FIG. 2.

As illustrated in FIGS. 2 and 3, the vehicle door 20 is a press door in which an inner panel 27 of the door panel 21 and an inner sash panel 51 of the sash member 23 are integrally formed, and an outer panel 28 of the door panel 21 and an outer sash panel 52 of the sash member 23 are integrally formed.

The door panel 21 includes the inner panel 27 located on the cabin side and the outer panel 28 located on the outer side of the vehicle. The inner panel 27, located on the cabin side, constitutes an inner wall of the door panel 21. The outer panel 28, located on the outer side of the vehicle, constitutes an outer wall of the door panel 21.

The door panel 21 is formed by joining the peripheries (except portions for accommodating a side window pane) of the inner panel 27 and the outer panel 28 together. The door panel 21 includes a door front edge 31 extending vertically at the front end 21a of the door panel 21 and a step 32 extending from the upper end 31a of the door front edge 31 to the sash member 23 (specifically the front door sash 45).

Figure 4:
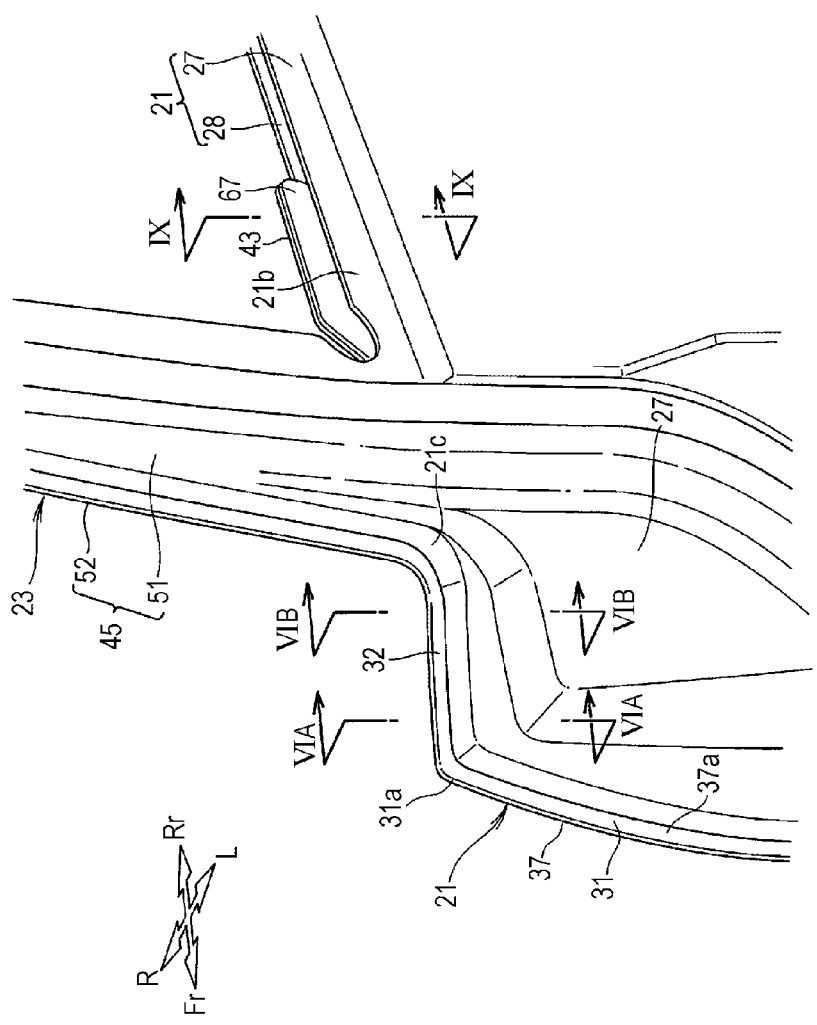
FIG. 4 is a perspective view illustrating a state of the vehicle door of FIG. 2 when viewed from an inner panel.
Figure 5:
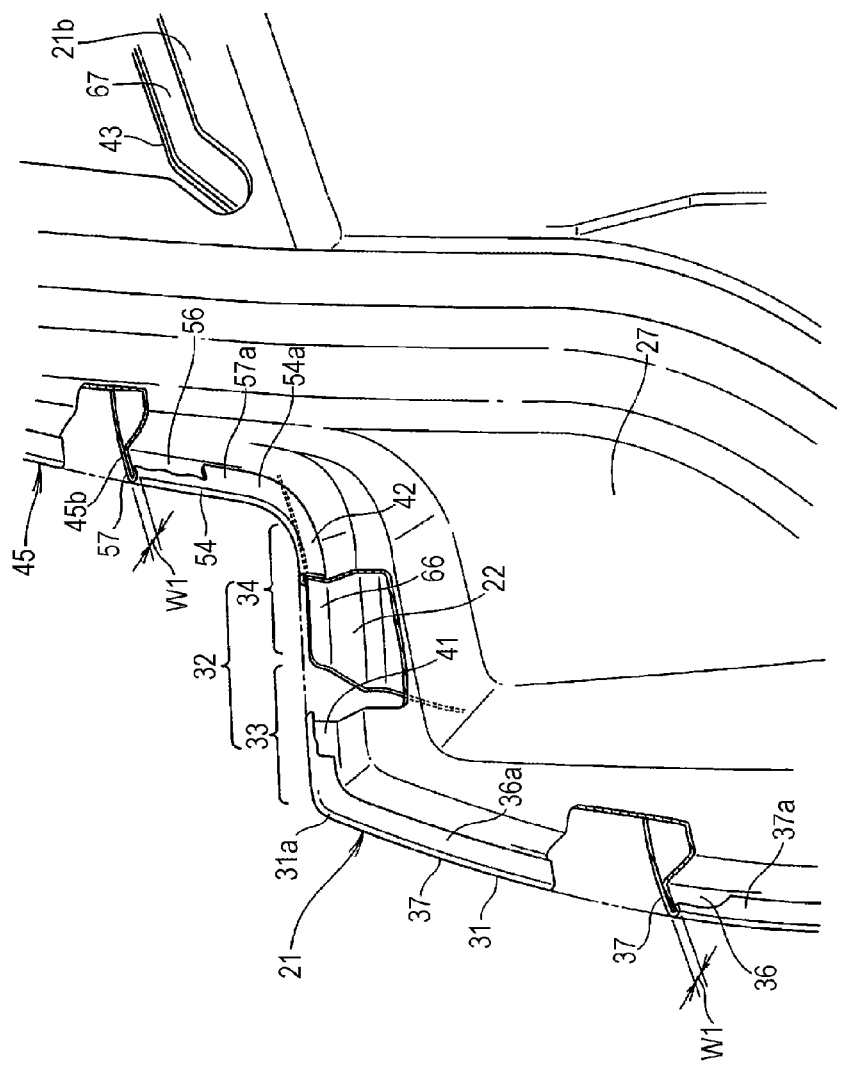
FIG. 5 is a perspective view illustrating a cut-out state of a main portion of the vehicle door of FIG. 4.

As illustrated in FIGS. 4 and 5, at the door front edge 31, an inner front portion 36 of the inner panel 27 corresponding to the door front edge 31 is joined to an outer front portion 37 of the outer panel 28 corresponding to the door front edge 31 by hemming.

Specifically, the inner front portion 36 and the outer front portion 37 are stacked, and a peripheral portion 37a of outer front portion 37 is bent over the inner front portion 36 by hemming. The bending of the peripheral portion 37a causes the inner front portion 36 to be sandwiched and held by the outer front portion 37. In this manner, the outer front portion 37 and the inner front portion 36 are joined together, and thereby, the outer front portion 37 and the inner front portion 36 constitute the door front edge 31.

Formation of the door front edge 31 by hemming can reduce a width W1 of the door front edge 31 in the vehicle width direction to (only) the thickness of the inner front portion 36 and the outer front portion 37. In addition, at the door front edge 31, formation of the step by hemming eliminates the necessity for using an adhesive or welding (e.g., MIG welding) in joining the inner front portion 36 and the outer front portion 37 together.

The step 32 is a portion of an upper edge 21b of the door panel 21 located forward of the sash member 23 (specifically a sash front edge 54) in the vehicle body. In other words, the step 32 substantially horizontally extends from a base 54a of the sash front edge 54 forward with respect to the vehicle body and is connected (coupled) to the upper end 31a of the door front edge 31.

In the step 32, an inner step portion (an inner portion) 41 of the inner panel 27 corresponding to the step 32, the first reinforcing member 22 interposed between the inner panel 27 and the outer panel 28, and an outer step portion (an outer portion) 42 of the outer panel 28 corresponding to the step 32 are joined together by hemming.

Specifically, the step 32 includes a front step 33 formed by joining the inner step portion 41 and the outer step portion 42 together by hemming and a rear step 34 formed by joining the inner step portion 41, the first reinforcing member 22, and the outer step portion 42 together by hemming.

As illustrated in FIGS. 5 and 6A, the front step 33 is formed by stacking a front portion 41a of the inner step portion 41 and a front portion 42a of the outer step portion 42, and bending a peripheral portion 42b of the front portion 42a over the front portion 41a of the inner step portion 41 by hemming. Bending of the peripheral portion 42b causes the front portion 41a of the inner step portion 41 to be sandwiched and held by the front portion 42a of the outer step portion 42.

In this manner, the front portions 41a and 42a of the inner step portion 41 and the outer step portion 42 are joined together, thereby forming the front step 33 including the front portions 41a and 42a. The formation of the front step 33 by hemming can reduce the width W1 of the front step 33 in the vehicle width direction to (only) the thickness of the inner step portion 41 and the outer step portion 42.

As illustrated in FIGS. 5 and 6B, the rear step 34 is formed by stacking a rear portion 41b of the inner step portion 41, a front upper joint portion 66 of the first reinforcing member 22, and a rear portion 42c of the outer step portion 42, and bending a peripheral portion 42d of the rear portion 42c over the rear portion 41b of the inner step portion 41 by hemming. The bending of the peripheral portion 42d causes the front upper joint portion 66 of the first reinforcing member 22 and the rear portion 41b of the inner step portion 41 to be sandwiched and held by the rear portion 42c of the outer step portion 42.

In this manner, the rear portion 41b of the inner step portion 41, the front upper joint portion 66 of the first reinforcing member 22, and the rear portion 42c of the outer step portion 42 are joined together, so that the rear portion 41b, the front upper joint portion 66, and the rear portion 42c constitute the rear step 34. The formation of the rear step 34 by hemming can reduce a width W2 of the rear step 34 in the vehicle width direction to (only) the thickness of the inner step portion 41, the first reinforcing member 22, and the outer step portion 42.

In this manner, formation of the front step 33 and the rear step 34 (i.e., the step 32) by hemming can reduce the widths W1 and W2 of the step 32 in the vehicle width direction. Accordingly, the step 32 (i.e., the upper edge 21b of the door panel 21) can be made narrower in the vehicle width direction.

In addition, formation of the step by joining the inner step portion 41 and the outer step portion 42 together by hemming eliminates the necessity for using an adhesive or welding (e.g., MIG welding) in joining the inner step portion 41 and the outer step portion 42 together. In this manner, redundant members (components) such as an adhesive or a welding rod are not needed, thereby reducing the cost and weight of the vehicle door 20.

Referring back to FIG. 1, the vehicle door 20 includes the sash member 23 above the upper edge 21b (i.e., door belt line). The door belt line is a portion corresponding to the upper edge 21b of the door panel 21. The sash member 23 includes a front door sash (a door sash) 45 extending along the front pillar 13, a rear door sash 46 extending along the center pillar, and an upper door sash 47 spanning between across upper ends 45a and 46a of the front door sash 45 and the rear door sash 46. The front door sash 45 and the rear door sash 46 support the side window pane such that the side window pane can be freely raised and lowered.

As illustrated in FIGS. 3 and 4, the front door sash 45 is located on a portion 21c of the upper edge 21b of the door panel 21 rearward of the door front edge 31 in the vehicle body, and extends vertically along the rear end of the front pillar 13.

The front door sash 45 includes an inner sash panel 51 located on the cabin side and the outer sash panel 52 located on the outer side of the vehicle. The inner sash panel 51 is integrally formed with the inner panel 27 of the door panel 21. The inner sash panel 51, located on the cabin side, constitutes an inner wall of the front door sash 45. The outer sash panel 52 is integrally formed with the outer panel 28 of the door panel 21. The outer sash panel 52, located on the outer side of the vehicle, constitutes an outer wall of the sash member 23.

Figure 7:
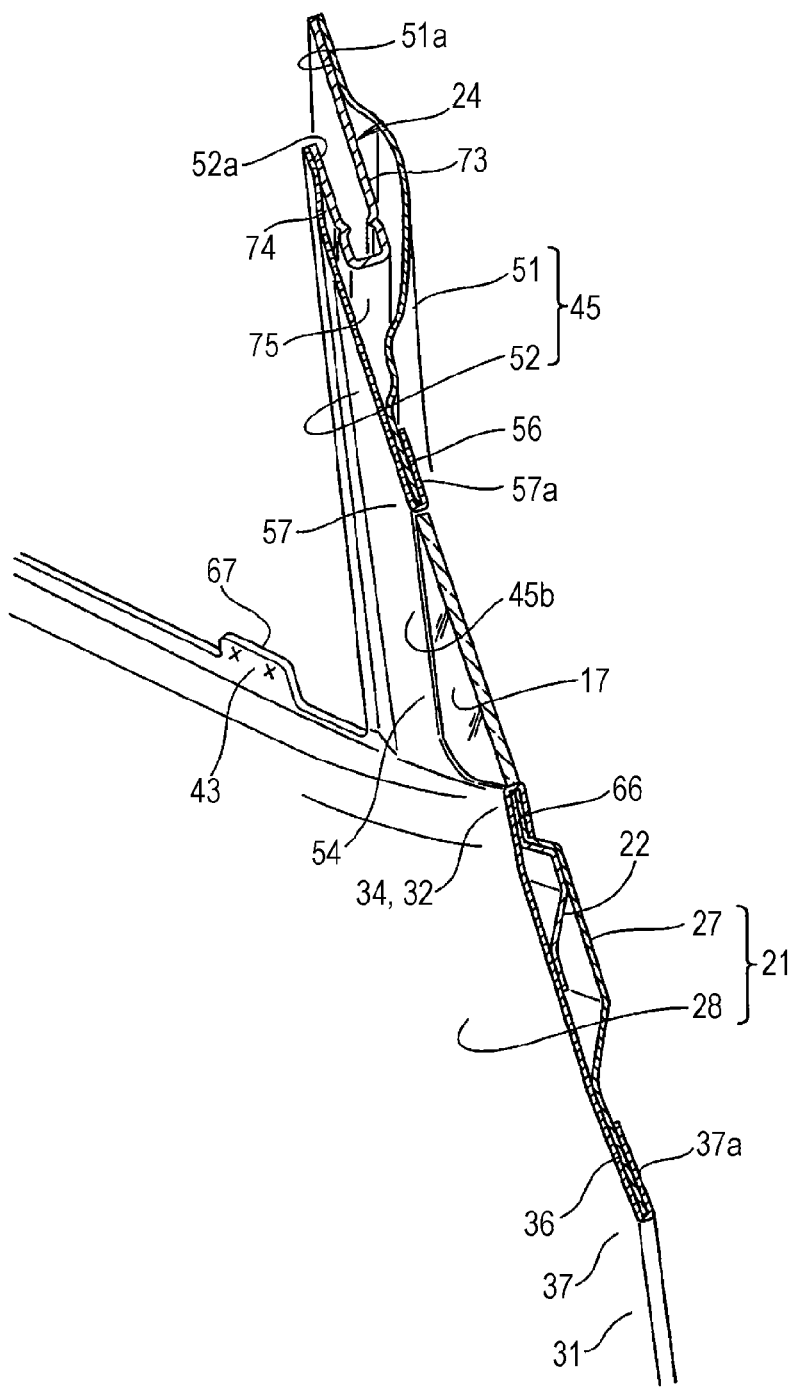
FIG. 7 is a cross-sectional view taken along line VII-VII in FIG. 1.

As illustrated in FIGS. 5 and 7, the front door sash 45 includes the sash front edge 54 extending vertically at the front end 45b of the front door sash 45. In the sash front edge 54, an inner sash portion 56 of the inner sash panel 51 corresponding to the sash front edge 54 and an outer sash portion 57 of the outer sash panel 52 corresponding to the sash front edge 54 are joined together by hemming.

Specifically, the inner sash portion 56 and the outer sash portion 57 are stacked, and a peripheral portion 57a of the outer sash portion 57 is bent over the inner sash portion 56 by hemming. The bending of the peripheral portion 57a causes the inner sash portion 56 to be sandwiched and held by the outer sash portion 57. In this manner, the outer sash portion 57 and the inner sash portion 56 are joined together, and the outer sash portion 57 and the inner sash portion 56 constitute the sash front edge 54.

In a manner similar to formation of the door front edge 31 and the step 32, formation of the sash front edge 54 by hemming can reduce the width W1 of the sash front edge 54 in the vehicle width direction to (only) the thickness of the outer sash portion 57 and the inner sash portion 56. In addition, the formation of the sash front edge 54 by hemming eliminates the necessity for use of an adhesive or welding (e.g., MIG welding) in joining the outer sash portion 57 and the inner sash portion 56 together.

In a manner similar to formation of the step 32, formation of the sash front edge 54 by hemming enables the sash front edge 54 and the step 32 to be integrally formed and continuous by hemming. In addition, by joining respectively the sash front edge 54 and the step 32 by hemming, the sash front edge 54 and the step 32 become flush with each other. In other words, no step difference is formed between the sash front edge 54 and the step 32 such that the sash front edge 54 and the step 32 are smoothly continuous with each other.

In this manner, the sash front edge 54 and the step 32 are integrally formed to be continuous with each other, and are made flush with each other, thereby achieving a continuous smooth boundary between the sash front edge 54 and the step 32. As a result, appearance (aesthetic quality) of the vehicle door 20 can be enhanced.

Referring back to FIGS. 2 and 6B, the first reinforcing member 22 is housed between the inner panel 27 and the outer panel 28. The first reinforcing member 22 is joined to a portion of the upper edge 21b of the door panel 21 near a base 45c of the front door sash 45.

Figure 8:
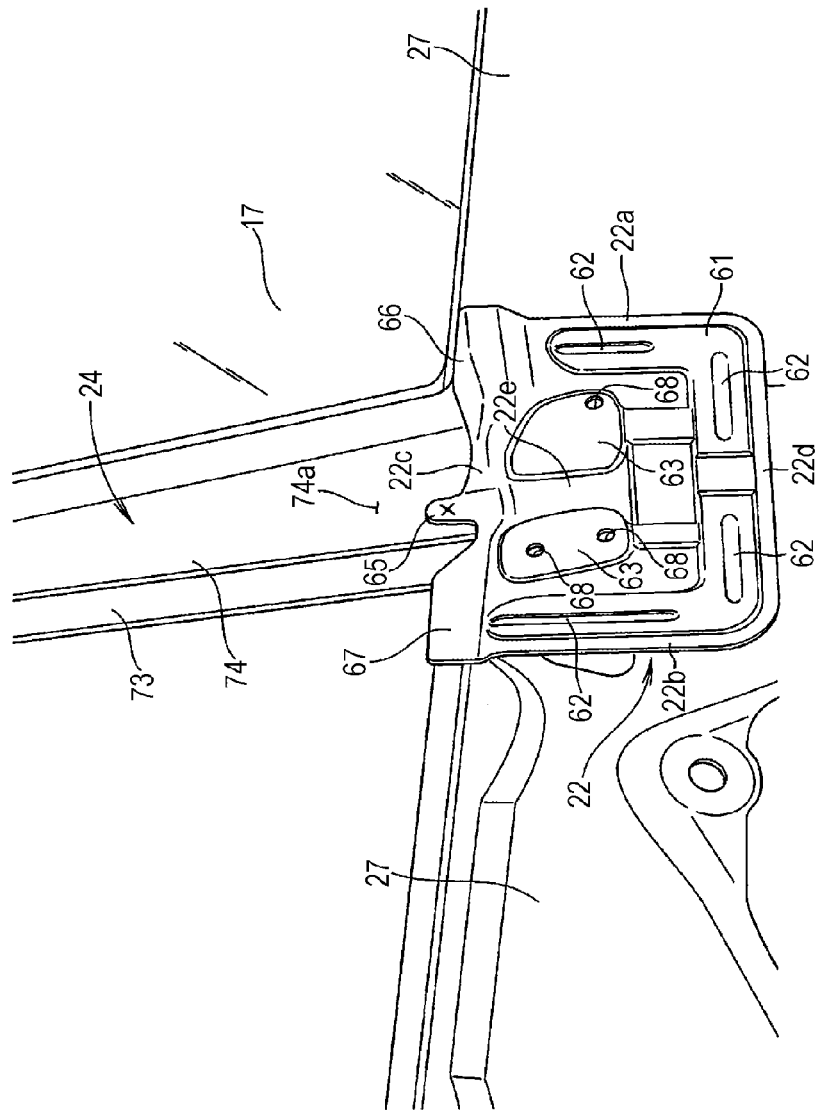
FIG. 8 is a perspective view showing a state in which an outer panel is detached from the vehicle door of FIG. 1.

As illustrated in FIG. 8, the first reinforcing member 22 has a substantially rectangular shape in side view formed by front and rear edges 22a and 22b and upper and lower edges 22c and 22d. The first reinforcing member 22 includes a substantially U-shaped outer protrusion 61 protruding toward the outer panel 28 along the front and rear edges 22a and 22b and the lower edge 22d, a plurality of ribs 62 formed on the outer protrusion 61, and a plurality of center protrusions 63 protruding from a center 22e toward the outer panel 28. The outer protrusion 61, the ribs 62, and the center protrusions 63 of the first reinforcing member 22 can maintain a rigidity of the first reinforcing member 22 high.

The first reinforcing member 22 includes a joint upper tab 65, the front upper joint portion 66, and a rear upper joint portion 67 on the upper edge 22c, and also includes a plurality of attachment holes 68 (which are three attachment holes in the embodiment) formed in the center protrusions 63.

The joint upper tab 65 projects upward from the center of the upper edge 22c, and thereby, extends along a surface 74a of the second reinforcing member 24 (specifically an outside wall 74). The joint upper tab 65 is in contact with the surface 74a of the outside wall 74 from the outside in the vehicle width direction, and is joined to the surface 74a by, for example, spot welding (see also FIG. 12).

Referring back to FIGS. 5 and 7, the front upper joint portion 66 is located forward of the joint upper tab 65 (see FIG. 8) with respect to the vehicle body, and thus, is located forward of the front door sash 45 in the vehicle body. The front upper joint portion 66 is joined to the inner panel 27 (the inner step portion 41) and the outer panel 28 (the outer step portion 42) by hemming in the rear step 34 of the step 32. This configuration can reduce the number of steps (processes) used in forming the door panel 21, as compared to the case of joining the front upper joint portion 66 of the first reinforcing member 22 to the rear step 34 of the step 32 in a different step.

Figure 9:
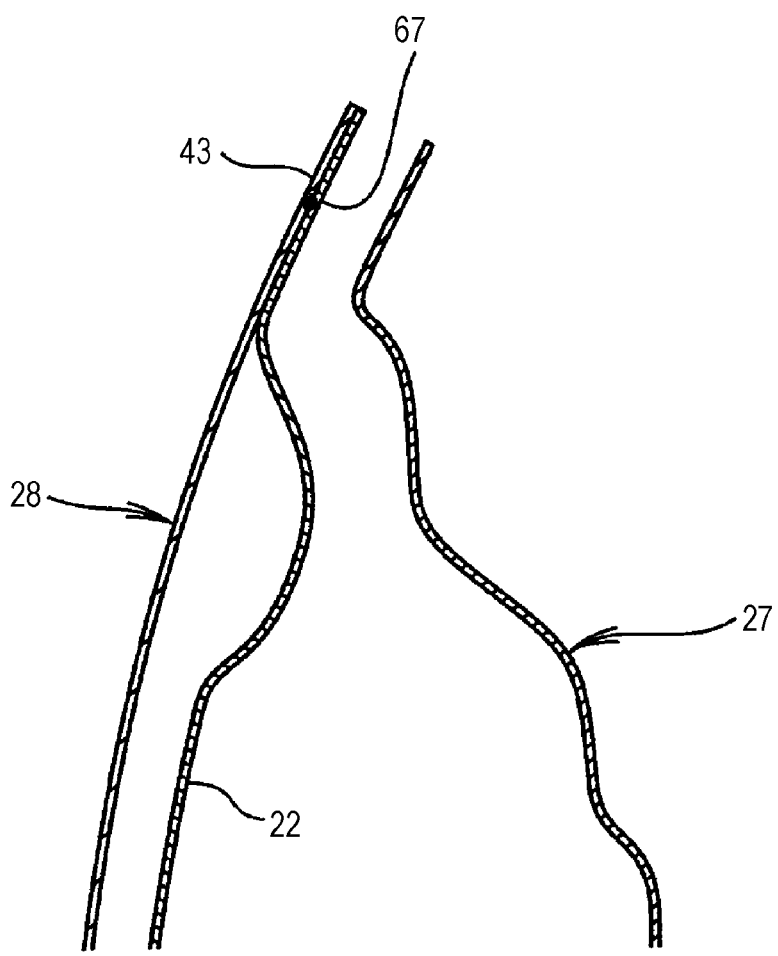
FIG. 9 is a cross-sectional view taken along line IX-IX in FIG. 4.

As illustrated in FIGS. 4 and 9, the rear upper joint portion 67 is located rearward of the joint upper tab 65 (see FIG. 8) in the vehicle body, and thus, is located rearward of the front door sash 45 in the vehicle body. The rear upper joint portion 67 is in contact with an inner side of an outer rear joint portion 43 of the outer panel 28 in the vehicle width direction, and is joined to the outer rear joint portion 43 by, for example, spot welding.

Referring back to FIG. 2, the front upper joint portion 66 of the first reinforcing member 22 is joined to the rear step 34 of the step 32 forward of the sash front edge 54 (i.e., the front door sash 45) in the vehicle (see also FIG. 6). Thus, the first reinforcing member 22 is joined to the outer panel 28 at two locations (i.e., the outer rear joint portion 43 and the rear step 34 of the step 32) sandwiching the front door sash 45 in the longitudinal direction, i.e., forward-to-rearward direction, of the vehicle body. In this manner, the first reinforcing member 22 and the outer panel 28 are reinforced by the front door sash 45.

The reinforcement of the first reinforcing member 22 and the outer panel 28 by the front door sash 45 can prevent deformation of the first reinforcing member 22 and the outer panel 28 in the vehicle width direction by means of the front door sash 45. In this manner, the first reinforcing member 22 can be stably attached, thereby stabilizing the joining of the rear step 34 of the step 32 by hemming.

Figure 10:
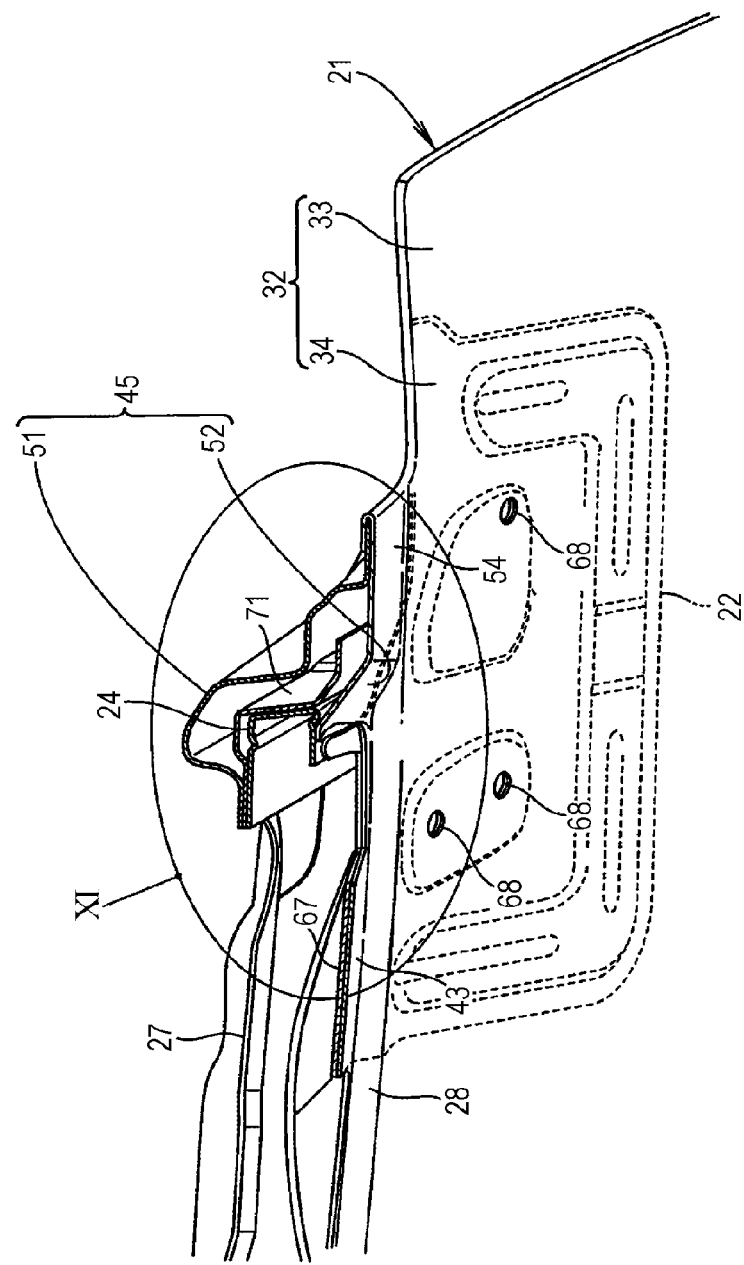
FIG. 10 is a perspective view illustrating a state in which the vehicle door is horizontally cut out above the upper edge of a door panel.

As illustrated in FIGS. 2 and 10, the second reinforcing member 24 is provided between the inner sash panel 51 and the outer sash panel 52 of the front door sash 45 (see also FIG. 7). In the second reinforcing member 24, a base 24a is provided between the inner panel 27 and the outer panel 28 of the door panel 21, and is supported by a support member 71 inside the outer panel 28. The second reinforcing member 24 extends vertically along the front door sash 45 from the base 24a while being sandwiched between, and housed in, the front door sash 45.

Figure 11:
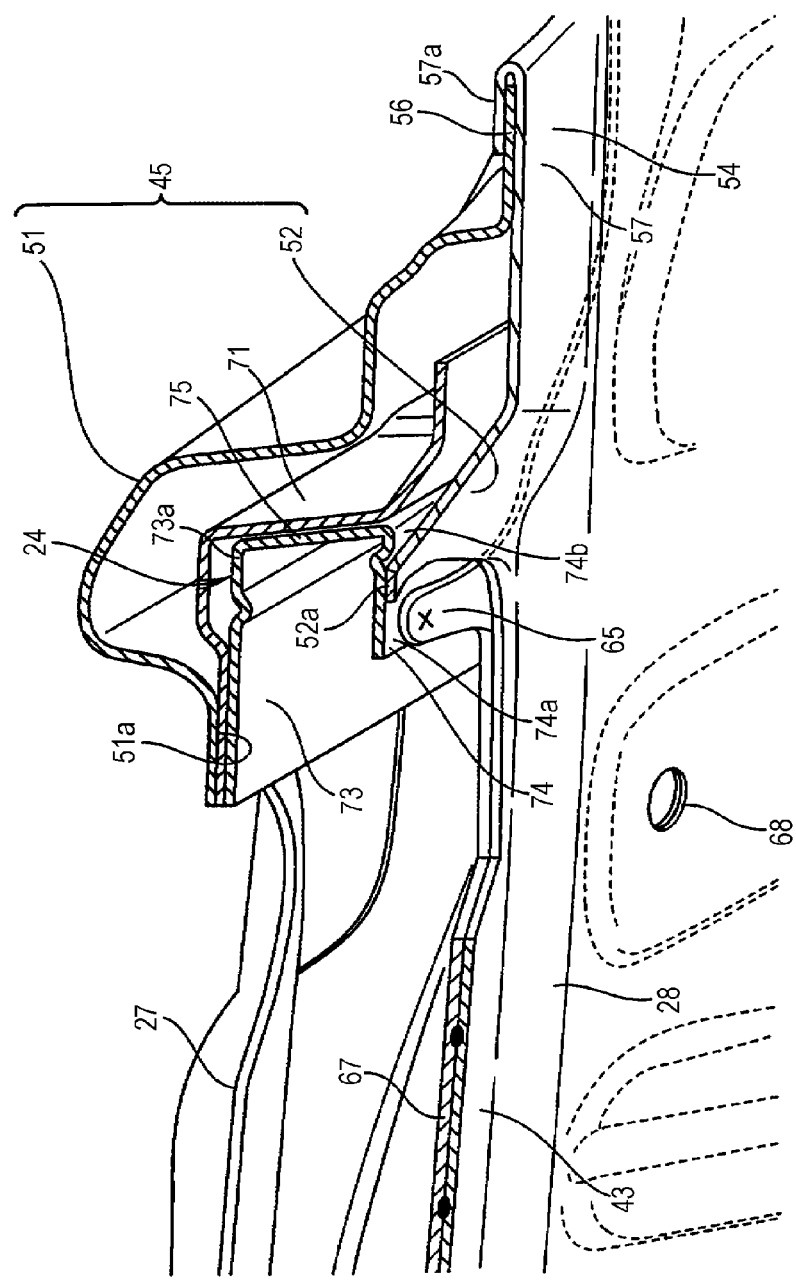
FIG. 11 is an enlarged view of a portion XI in FIG. 10.

As illustrated in FIGS. 7 and 11, an upper portion of the base 24a of the second reinforcing member 24 includes an inner wall 73 joined to an inner surface 51a of the inner sash panel 51, an outside wall 74 joined to an inner surface 52a of the outer sash panel 52, and a bottom wall 75 coupling a front side 73a of the inner wall 73 and a front side 74b of the outside wall 74 to each other. That is, the second reinforcing member 24 is joined to the front door sash 45.

The second reinforcing member 24 is substantially U-shaped in cross section formed by the inner wall 73, the outside wall 74, and the bottom wall 75. The substantially U-shaped cross section of the second reinforcing member 24 can secure rigidity for the second reinforcing member 24. To the outside wall 74 (specifically the surface 74a) of this rigid second reinforcing member 24, the joint upper tab 65 of the first reinforcing member 22 is joined from the outside in the vehicle width direction by welding (e.g., spot welding). Thus, the first reinforcing member 22 is joined to the front door sash 45 via the outside wall 74 of the second reinforcing member 24.

The joining of the first reinforcing member 22 to the front door sash 45 via the second reinforcing member 24 allows the first reinforcing member 22 to be strongly reinforced by the second reinforcing member 24 and the front door sash 45. In this manner, the rigidity of the first reinforcing member 22 can be enhanced by the second reinforcing member 24 and the front door sash 45, thereby suitably preventing deformation of the first reinforcing member 22 in the vehicle width direction. In addition, the rigidity of the first reinforcing member 22 enhanced by the second reinforcing member 24 and the front door sash 45 can further stabilize the joining of the rear step 34 of the step 32 by hemming.

Figure 12:
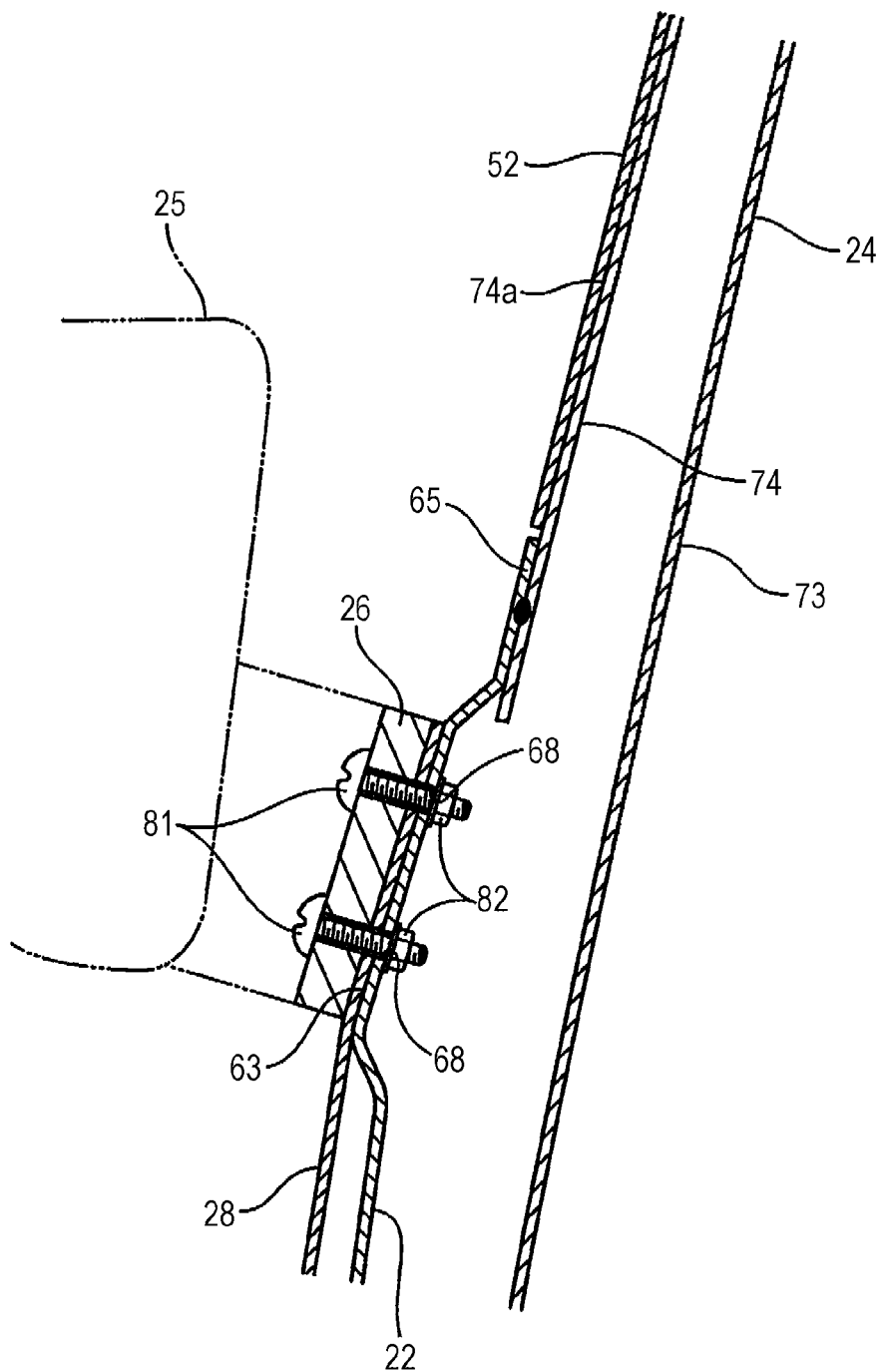
FIG. 12 is a cross-sectional view taken along line XII-XII in FIG. 1.

As illustrated in FIGS. 2 and 12, a mirror base 26 of the door mirror 25 is attached to the outer panel 28 and the first reinforcing member 22 with a plurality of bolts 81 and a plurality of nuts 82 with the mirror base 26 being disposed on a side of the outer panel 28 on the outer side of the vehicle body. Thus, the first reinforcing member 22 is screwed to the outer panel 28 with the bolts 81 and the nuts 82. In addition, the front upper joint portion 66 and the rear upper joint portion 67 of the first reinforcing member 22 are joined to the outer panel 28. In this manner, the first reinforcing member 22 is firmly attached to the outer panel 28.

In addition, as illustrated in FIG. 8, the outer protrusion 61, the ribs 62, and the center protrusions 63 of the first reinforcing member 22 can enhance the rigidity of the first reinforcing member 22. In this manner, attachment of the door mirror 25 to the rigid first reinforcing member 22 enables the door mirror 25 to be firmly attached to the vehicle door 20.

The vehicle door of the present application is not limited to the type described in the foregoing embodiment, and may be modified and/or improved as necessary. For example, the shapes and configurations of, for example, the vehicle, the vehicle door, the door panel, the first reinforcing member, the second reinforcing member, the door mirror, the inner panel, the outer panel, the door front edge, the step, the inner step portion, the outer step portion, the front door sash, the inner sash panel, the outer sash panel, the sash front edge, the inner sash portion, the outer sash portion, the inner wall, the outside wall, and the bottom wall are not limited to those described in the embodiment, and may be changed or modified as necessary.

The vehicle door of the present application is preferably applied to an automobile in which a door panel is formed by joining an inner panel and an outer panel together and a door sash stands on the door panel.

What is claimed is:

1. A vehicle door comprising:
   a door panel including an inner panel and an outer panel joined together;
   a door sash extends generally vertically from the door panel;
   a door front edge extending generally vertically at a front end of the door panel;
   a sash front edge generally vertically extending at a front end of the door sash, the door sash being located at a rear of the door front edge in a longitudinal direction of a vehicle body;
   a step extending forward from the sash front edge to an upper end of the door front edge and connected to the upper end of the door front edge, wherein the step is formed by joining a first portion of the inner panel corresponding to the step and a second portion of the outer panel corresponding to the step together by hemming; and
   a first reinforcing member located between the inner panel and the outer panel ,wherein the first reinforcing member is joined to the first portion and the second portion in the step by hemming,
   wherein
   the door sash includes
     an inner sash panel constituting an inner wall of the door sash and
     an outer sash panel constituting an outside wall of the door sash,
   wherein a first sash portion of the inner sash panel corresponding to the sash front edge and a second sash portion of the outer sash panel corresponding to the sash front edge are joined together by hemming such that the sash front edge is continuous with the step,
   wherein the first reinforcing member is joined to the door sash,
   wherein the vehicle door further comprises a second reinforcing member located between the inner sash panel and the outer sash panel,
   wherein
   the second reinforcing member includes
     a second inner wall joined to the inner sash panel,
     a second outside wall joined to the outer sash panel, and
     a bottom wall coupling the second inner wall and the second outside wall together,
   the second inner wall, the second outside wall, and the bottom wall form a substantially U shaped cross section of the second reinforcing member, and
   the first reinforcing member is joined to the second reinforcing member such that the first reinforcing member is joined to the door sash via the second reinforcing member.

2. The vehicle door of claim 1, wherein the sash front edge and the step are formed to be flush with each other by hemming.

3. The vehicle door of claim 1, wherein
   the first reinforcing member is joined to the outer panel at a position at a rear of the door sash.

4. The vehicle door of claim 1, wherein
   a door mirror is attached to the first reinforcing member with the door mirror being disposed on an outer side of the outer panel with respect to the vehicle body.

5. A vehicle door comprising:
   a door panel including an inner panel and an outer panel joined together;
   a door sash extends generally vertically from the door panel;
   a door front edge extending generally vertically at a front end of the door panel;
   a sash front edge generally vertically extending at a front end of the door sash, the door sash being located at a rear of the door front edge in a longitudinal direction of a vehicle body;
   a step extending forward from the sash front edge to an upper end of the door front edge and connected to the upper end of the door front edge, wherein the step is formed by joining a first portion of the inner panel corresponding to the step and a second portion of the outer panel corresponding to the step together by hemming; and
   a first reinforcing member located between the inner panel and the outer panel ,wherein the first reinforcing member is joined to the first portion and the second portion in the step by hemming,
   wherein
   the door sash includes
     an inner sash panel constituting an inner wall of the door sash and
     an outer sash panel constituting an outside wall of the door sash,
     wherein the first reinforcing member is joined to the door sash,
   wherein the vehicle door further comprises a second reinforcing member located between the inner sash panel and the outer sash panel,
   wherein
   the second reinforcing member includes
     a second inner wall joined to the inner sash panel,
     a second outside wall joined to the outer sash panel, and
     a bottom wall coupling the second inner wall and the second outside wall together,
   the second inner wall, the second outside wall, and the bottom wall form a substantially U shaped cross section of the second reinforcing member, and
   the first reinforcing member is joined to the second reinforcing member such that the first reinforcing member is joined to the door sash via the second reinforcing member

* * * * *